United States Patent
Hirose et al.

(10) Patent No.: US 10,686,190 B2
(45) Date of Patent: Jun. 16, 2020

(54) NEGATIVE ELECTRODE ACTIVE MATERIAL, MIXED NEGATIVE ELECTRODE ACTIVE MATERIAL, NEGATIVE ELECTRODE FOR NONAQUEOUS ELECTROLYTE SECONDARY BATTERY, LITHIUM ION SECONDARY BATTERY, AND, PRODUCTION METHOD OF NEGATIVE ELECTRODE ACTIVE MATERIAL

(71) Applicant: SHIN-ETSU CHEMICAL CO., LTD., Tokyo (JP)

(72) Inventors: Takakazu Hirose, Annaka (JP); Hiromichi Kamo, Takasaki (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 274 days.

(21) Appl. No.: 15/772,566

(22) PCT Filed: Nov. 4, 2016

(86) PCT No.: PCT/JP2016/004807
§ 371 (c)(1),
(2) Date: May 1, 2018

(87) PCT Pub. No.: WO2017/085911
PCT Pub. Date: May 26, 2017

(65) Prior Publication Data
US 2019/0097223 A1    Mar. 28, 2019

(30) Foreign Application Priority Data
Nov. 18, 2015 (JP) .................. 2015-225323

(51) Int. Cl.
*H01M 4/485* (2010.01)
*H01M 4/48* (2010.01)
(Continued)

(52) U.S. Cl.
CPC ............. *H01M 4/485* (2013.01); *H01M 4/36* (2013.01); *H01M 4/48* (2013.01); *H01M 4/66* (2013.01);
(Continued)

(58) Field of Classification Search
CPC ............................. H01M 4/485; C01B 33/133
See application file for complete search history.

(56) References Cited

U.S. PATENT DOCUMENTS

| | | | |
|---|---|---|---|
| 5,395,711 A | 3/1995 | Tahara et al. | |
| 7,459,236 B2 | 12/2008 | Konishiike et al. | |

(Continued)

FOREIGN PATENT DOCUMENTS

| | | |
|---|---|---|
| CN | 104603993 A | 5/2015 |
| EP | 3361535 A1 | 8/2018 |

(Continued)

OTHER PUBLICATIONS

Jan. 21, 2020 Office Action issued in Taiwanese Patent Application No. 105137004.
(Continued)

*Primary Examiner* — Maria Laios
(74) *Attorney, Agent, or Firm* — Oliff PLC (57) ABSTRACT

A negative electrode active material includes particles of negative electrode active material, wherein the particles of negative electrode active material contain particles of silicon compound containing silicon compound ($SiO_x$: $0.5 \leq x \leq 1.6$), the particles of negative electrode active material contain crystalline $Li_2SiO_3$ in at least a part thereof, and the particles of negative electrode active material satisfy the following formula 1 and formula 2 between an intensity A of a peak derived from $Li_2SiO_3$, an intensity B of a peak derived from Si, an intensity C of a peak derived from $Li_2Si_2O_5$, and an intensity D of a peak derived from $SiO_2$, which are obtained (Continued)

from a $^{29}$Si-MAS-NMR spectrum. Thus a negative electrode active material capable of increasing a battery capacity, and improving the cycle characteristics and initial charge/discharge characteristics when used as a negative electrode active material of the lithium ion secondary battery is provided.

$$A > B > D \tag{1}$$

$$A > C > D \tag{2}$$

14 Claims, 2 Drawing Sheets

(51) Int. Cl.
    *H01M 4/66* (2006.01)
    *H01M 4/36* (2006.01)
    *H01M 4/02* (2006.01)
    *H01M 10/0525* (2010.01)

(52) U.S. Cl.
    CPC .. *H01M 10/0525* (2013.01); *H01M 2004/027* (2013.01)

(56) References Cited

U.S. PATENT DOCUMENTS

| | | |
|---|---|---|
| 8,377,592 B2 | 2/2013 | Jeong et al. |
| 2006/0099507 A1 | 5/2006 | Kogetsu et al. |
| 2008/0176137 A1 | 7/2008 | Endo et al. |
| 2009/0202911 A1 | 8/2009 | Fukuoka et al. |
| 2014/0205907 A1 | 7/2014 | Kang et al. |
| 2015/0221950 A1* | 8/2015 | Minami ............ H01M 10/0525 429/223 |
| 2016/0233484 A1* | 8/2016 | Hirose ................ H01M 4/0404 |
| 2018/0261833 A1 | 9/2018 | Hirose et al. |

FOREIGN PATENT DOCUMENTS

| | | |
|---|---|---|
| JP | 2997741 B2 | 1/2000 |
| JP | 2001-185127 A | 7/2001 |
| JP | 2002-042806 A | 2/2002 |
| JP | 2006-114454 A | 4/2006 |
| JP | 2006-164954 A | 6/2006 |
| JP | 2007-234255 A | 9/2007 |
| JP | 2008-177346 A | 7/2008 |
| JP | 2008-251369 A | 10/2008 |
| JP | 2008-282819 A | 11/2008 |
| JP | 2009-070825 A | 4/2009 |
| JP | 2009-205950 A | 9/2009 |
| JP | 2009-212074 A | 9/2009 |
| JP | 2013-161705 A | 8/2013 |
| JP | 2013-251097 A | 12/2013 |
| JP | 2015-508559 A | 3/2015 |
| JP | 2015-153520 A | 8/2015 |
| JP | 2015-156355 A | 8/2015 |
| JP | 2015-165482 A | 9/2015 |
| WO | 2015/063979 A1 | 5/2015 |

OTHER PUBLICATIONS

Nov. 13, 2018 Office Action issued in Japanese Patent Application No. 2015-225323.
Jun. 12, 2019 Search Report issued in European Patent Application No. 16865915.9.
Dec. 13, 2016 International Search Report issued in International Patent Application No. PCT/JP2016/004807.

* cited by examiner

NEGATIVE ELECTRODE ACTIVE MATERIAL, MIXED NEGATIVE ELECTRODE ACTIVE MATERIAL, NEGATIVE ELECTRODE FOR NONAQUEOUS ELECTROLYTE SECONDARY BATTERY, LITHIUM ION SECONDARY BATTERY, AND, PRODUCTION METHOD OF NEGATIVE ELECTRODE ACTIVE MATERIAL

TECHNICAL FIELD

The present invention relates to a negative electrode active material, a mixed negative electrode active material, a negative electrode for non-aqueous electrolyte secondary battery, a lithium ion secondary battery, a production method of a negative electrode active material, and a production method of a lithium ion secondary battery.

BACKGROUND ART

In recent years, small-sized electronic devices represented by mobile terminals and the like have been widely spread and further down-sizing, lighter weight and longer life are strongly demanded. To a market demand like this, developments of secondary batteries capable of obtaining, in particular, a smaller size, a lighter weight and a higher energy density have been forwarded. The secondary batteries have been studied to apply also to large-sized electronic devices represented by automobiles and power-storage systems represented by houses or the like without limiting to small-sized electronic devices.

Among these, a lithium ion secondary battery is highly expected because smaller size and higher capacity are easy to obtain and the energy density higher than that of a lead battery or a nickel-cadmium battery may be obtained.

The lithium ion secondary battery includes a positive electrode and a negative electrode, and an electrolytic solution together with a separator. The negative electrode includes a negative electrode active material related to a charge/discharge reaction.

As the negative electrode active material, while a carbon material is widely used, a further improvement in a battery capacity is demanded from recent market demand. In order to improve the battery capacity, it has been studied to use silicon as the negative electrode active material. This is because the silicon has a theoretical capacity (4199 mAh/g) of 10 times or more a theoretical capacity of graphite (372 mAh/g), and a great improvement in the battery capacity is expected. A development of a silicon material as the negative electrode active material includes studies on not only a silicon simple substance but also on compounds represented by alloys, oxides or the like. Furthermore, shapes of the active material have been studied, regarding the carbon material, from a standard coating type to an integrated type directly deposited on a current collector.

However, when the silicon is used as a main raw material as the negative electrode active material, since the negative electrode active material expands and contracts during charge/discharge, mainly the neighborhood of a superficial layer of the negative electrode active material becomes easily broken. Furthermore, an ionic substance is generated inside the active material, and the negative electrode active material becomes easily broken. When the superficial layer of the negative electrode active material is broken, a new surface is generated thereby, and a reaction area of the active material increases. At this time, the electrolytic solution is consumed since a decomposition reaction of an electrolytic solution occurs on the new surface and a film that is a decomposition product of the electrolytic solution is formed on the new surface. Therefore, the cycle characteristics become easily degraded.

Until now, in order to improve an initial efficiency and cycle characteristics of a battery, negative electrode materials for lithium ion secondary batteries having the silicon material as a main material and electrode configurations have been variously studied.

Specifically, in order to obtain excellent cycle characteristics and high safety, silicon and amorphous silicon dioxide are simultaneously deposited by using a gas phase method (see, for example, Patent Literature 1 below). Furthermore, in order to obtain high battery capacity and safety, a carbon material (an electronically conductive material) is provided on a superficial layer of particles of silicon oxide (see, for example, Patent Literature 2 below). Furthermore, in order to improve the cycle characteristics and to obtain high input/output characteristics, an active material containing silicon and oxygen is prepared and an active material layer having a high oxygen ratio in the neighborhood of a current collector is formed (see, for example, Patent Literature 3 below). Still furthermore, in order to improve the cycle characteristics, oxygen is contained in a silicon active material such that an average oxygen content is 40 atomic percent or less, and an oxygen content is high in a place close to a current collector (see, for example, Patent Literature 4 below).

Furthermore, in order to improve a first time charge/discharge efficiency, a nano composite containing a Si phase, $SiO_2$ and $M_yO$ metal oxide is used (see, for example, Patent Literature 5, below). Still furthermore, in order to improve the cycle characteristics, $SiO_x$ ($0.8 \leq x \leq 1.5$, a particle size range=1 μm to 50 μm) and a carbon material are mixed and sintered at a high temperature (see, for example, Patent Literature 6, below). Furthermore, in order to improve the cycle characteristics, an active material is controlled in the range such that a molar ratio of oxygen to silicon in a negative electrode active material is from 0.1 to 1.2, and, a difference of the maximum value and the minimum value of the molar ratio in the neighborhood of an interface of the active material and a current collector is 0.4 or less (see, for example, Patent Literature 7, below). Still furthermore, in order to improve battery load characteristics, a metal oxide containing lithium is used (see, for example, Patent Literature 8, below). Furthermore, in order to improve the cycle characteristics, a hydrophobic layer such as a silane compound is formed on a superficial layer of a silicon material (see, for example, Patent Literature 9, below). Still furthermore, in order to improve the cycle characteristics, silicon oxide is used, and a graphite film is formed on a superficial layer thereof to impart electric conductivity (see, for example, Patent Literature 10, below). In the Patent Literature 10, regarding a shift value obtained from a Raman spectrum of the graphite film, broad peaks appear at 1330 $cm^{-1}$ and 1580 $cm^{-1}$, and an intensity ratio thereof $I_{1330}/I_{1580}$ is $1.5 < I_{1330}/I_{1580} < 3$. Furthermore, in order to obtain high battery capacity and to improve cycle characteristics, particles having a silicon crystallite phase dispersed in silicon dioxide are used (see, for example, Patent Literature 11, below). Still furthermore, in order to improve overcharge and overdischarge characteristics, silicon oxide in which an atomic ratio of silicon and oxygen is controlled to 1:"y" ($0<y<2$) is used (see, for example, Patent Literature 12, below).

CITATION LIST

Patent Literature

Patent Literature 1: JP 2001-185127 A
Patent Literature 2: JP 2002-042806 A
Patent Literature 3: JP 2006-164954 A
Patent Literature 4: JP 2006-114454 A
Patent Literature 5: JP 2009-070825 A
Patent Literature 6: JP 2008-282819 A
Patent Literature 7: JP 2008-251369 A
Patent Literature 8: JP 2008-177346 A
Patent Literature 9: JP 2007-234255 A
Patent Literature 10: JP 2009-212074 A
Patent Literature 11: JP 2009-205950 A
Patent Literature 12: JP 2997741 B1

SUMMARY OF INVENTION

Technical Problem

As was described above, in recent years, higher performance and multi-functionalization of small-sized mobile devices typical in the electronic devices have been forwarded, and a lithium ion secondary battery that is a main power source thereof is required to have an increased battery capacity. As one measure to solve the problem, it is desired to develop a lithium ion secondary battery formed of a negative electrode that uses a silicon material as a main material. Furthermore, the lithium ion secondary battery that uses the silicon-based active material is desired to have the first time efficiency and cycle characteristics close to equivalent with those of a lithium ion secondary battery that uses a carbon-based active material. However, a negative electrode active material that shows the same first time efficiency and cycle stability as those in the lithium ion secondary battery that uses a carbon-based active material has not been proposed.

The present invention was performed in view of the above problems, and it is intended to provide a negative electrode active material, a mixed negative electrode active material containing the negative electrode active material, a negative electrode for nonaqueous electrolyte secondary battery containing the mixed negative electrode active material, and a lithium ion secondary battery, which are capable of increasing battery capacity and improving cycle characteristics and initial charge/discharge characteristics when used as the negative electrode active material of a lithium ion secondary battery.

Furthermore, the present invention also intends to provide a production method of the negative electrode active material having the excellent battery characteristics like this and a production method of lithium ion secondary battery.

Solution to Problem

In order to achieve the above object, the present invention provides a negative electrode active material characterized in that the negative electrode active material contains particles of negative electrode active material, the particles of negative electrode active material contain particles of silicon compound containing a silicon compound ($SiO_x$: $0.5 \leq x \leq 1.6$), the particles of negative electrode active material contain crystalline $Li_2SiO_3$ in at least a part thereof, and the particles of negative electrode active material satisfy the following formula 1 and formula 2 between an intensity A of a peak derived from $Li_2SiO_3$, an intensity B of a peak derived from Si, an intensity C of a peak derived from $Li_2Si_2O_5$, and an intensity D of a peak derived from $SiO_2$, which are obtained from a $^{29}$Si-MAS-NMR spectra.

$$A>B>D \tag{1}$$

$$A>C>D \tag{2}$$

The negative electrode active material of the present invention may improve the battery capacity because the negative electrode active material contain particles of negative electrode active material containing particles of silicon compound. Furthermore, irreversible capacity being generated during the charge may be reduced because $SiO_2$ a part of which reacts with lithium during charge of the secondary battery to be an irreversible component in the silicon compound is modified in advance to lithium silicates such as $Li_2SiO_3$ or the like. Furthermore, when the particles of negative electrode active material satisfy a formula 1 or a formula 2, it may be said that $SiO_2$ contained in the particles of negative electrode active material is scarce based on $Li_2SiO_3$ and Si, or $SiO_2$ is scarce based on $Li_2SiO_3$ and $Li_2Si_2O_5$. Therefore, the initial efficiency and cycle characteristics of the battery may be improved. Furthermore, when the A>B is satisfied like in the formula 1, the irreversible capacity of the battery is reduced because it may be said that a majority of the $SiO_2$ is modified to $Li_2SiO_3$. Still furthermore, when the B>D is satisfied like in the formula 1, higher battery capacity may be obtained because it may be said that Si that occludes and stores lithium during the charge/discharge of the battery exists in a sufficient amount. Furthermore, when the A>C is satisfied like in the formula 2, the stability to the aqueous slurry used during electrode preparation is improved and the cycle characteristics are also improved because it may be said that $Li_2SiO_3$ more stable than unstable $Li_2Si_2O_5$ that tends to be eluted into the aqueous slurry or the like is present in abundance in the lithium silicate obtained by modifying $SiO_2$. Still furthermore, when A>C is satisfied and C>D is further satisfied like in the formula 2, the negative electrode active material that is stable and may reduce the irreversible capacity due to the $SiO_2$ is obtained.

At this time, it is preferable that a chemical shift value obtained from the $^{29}$Si-MAS-NMR spectrum preferably has a peak in the vicinity of −130 ppm.

The peak of which chemical shift value is obtained in the vicinity of −130 ppm is assumed as a peak derived from amorphous silicon (hereinafter, referred to also as a-Si). Thus, when a peak derived from amorphous silicon is detected, the initial efficiency and cycle characteristics of the secondary battery may be more improved because it may be said that $SiO_2$ is more sufficiently modified.

Furthermore, at this time, it is preferable that the chemical shift value obtained from the $^{29}$Si-MAS-NMR spectrum has a peak in −40 to −60 ppm.

A peak that appears in the range of from −40 to −60 ppm as the chemical shift value is also a peak derived from amorphous silicon. Therefore, in the same manner as the above, the negative electrode active material capable of improving the initial efficiency and cycle characteristics of the secondary battery is obtained.

Furthermore, it is preferable that the particles of silicon compound have a half value width (2θ) of a diffraction peak derived from a Si(111) crystal plane obtained by X-ray diffractometry of 1.2θ or more and a crystallite size corresponding to the crystal plane of 7.5 nm or less.

When the negative electrode active material in which the particles of silicon compound have the silicon crystallinity is used as the negative electrode active material of a lithium ion secondary battery, more excellent cycle characteristics and initial charge/discharge characteristics may be obtained.

Furthermore, when a test cell formed of a negative electrode containing a mixture of the negative electrode active material and a carbon-based active material and a counter electrode lithium is prepared, in the test cell, charge/discharge including charge during which a current is flowed so as to insert lithium into the negative electrode active material and discharge during which the current is flowed so as to desorb the lithium from the negative electrode active material is carried out 30 times, and when a graph showing a relationship between a differential value dQ/dV obtained by differentiating a discharge capacity Q by a potential V of the negative electrode based on the counter electrode lithium and the potential V is depicted in each charge/discharge, the potential V of the negative electrode during discharges on or after X times ($1 \leq X \leq 30$) preferably has a peak in the range of from 0.40 V to 0.55 V.

Since the above peak in the V-dQ/dV curve is similar to the peak of the silicon material and has a sharp rise of a discharge curve on a higher potential side, when a battery is designed, a capacity is easily developed. Furthermore, the negative electrode active material in which a stable bulk is formed is obtained when the peak is developed during the charge/discharge within 30 times.

Furthermore, a median diameter of the particles of negative electrode active material is preferably 1.0 µm or more and 15 µm or less.

When the median diameter is 1.0 µm or more, an increase of the battery irreversible capacity may be suppressed from increasing due to an increase in a surface area a mass. On the other hand, by setting the median diameter to 15 µm or less, the particles become difficult to be cracked and a new surface is difficult to be developed.

Furthermore, it is preferable that the particles of negative electrode active material contain a carbon material on a superficial layer part.

The electric conductivity may be improved when the particles of negative electrode active material contain the carbon material on the superficial layer part thereof like this.

Furthermore, it is preferable that an average thickness of the carbon material is 10 nm or more and 5000 nm or less.

The electric conductivity may be improved when the average thickness of the carbon material is 10 nm or more. Furthermore, when an average thickness of the carbon material to be coated is 5000 nm or less, by using the negative electrode active material containing the particles of negative electrode active material like this in a lithium ion secondary battery, the battery capacity may be suppressed from degrading because the particles of silicon compound may be sufficiently secured.

A mixed negative electrode active material characterized by containing the negative electrode active material and the carbon-based active material is provided.

Thus, the electric conductivity of the negative electrode active material layer may be improved and an expansion stress accompanying the charge may be alleviated when the carbon-based active material is contained together with the negative electrode active material (silicon-based negative electrode active material) of the present invention as a material forming a negative electrode active material layer. Furthermore, by mixing the silicon-based negative electrode active material with the carbon-based active material, the battery capacity may be improved.

Furthermore, in order to achieve the object, the present invention provides a negative electrode for nonaqueous electrolyte secondary battery, characterized by containing the mixed negative electrode active material and by having a ratio of a mass of the negative electrode active material relative to a sum total of masses of the negative electrode active material and the carbon-based active material of 6% by mass or more.

The battery capacity may be further improved, when the ratio of the mass of the negative electrode active material (silicon-based negative electrode active material) relative to a sum total of masses of the negative electrode active material (silicon-based negative electrode active material) and the carbon-based active material is 6% by mass or more.

Furthermore, in order to achieve the object, the present invention provides a negative electrode for nonaqueous electrolyte secondary battery, characterized by having a negative electrode active material layer formed with the mixed negative electrode active material and a negative electrode current collector, by having the negative electrode active material layer formed on the negative electrode current collector, by having the negative electrode current collector containing carbon and sulfur, and by having a content of each thereof of 100 mass ppm or less.

Thus, the negative electrode may be suppressed from being deformed during the charge when the negative electrode current collector constituting the negative electrode contains the carbon and sulfur in the amount described above.

Furthermore, in order to achieve the object, the present invention provides a lithium ion secondary battery characterized by using the negative electrode containing the negative electrode active material.

High capacity, excellent cycle characteristics and initial charge/discharge characteristics are obtained when the lithium ion secondary battery uses the negative electrode containing the negative electrode active material like this.

Furthermore, in order to achieve the object, the present invention provides a production method of a negative electrode active material that is a method of producing the negative electrode active material containing particles of negative electrode active material containing particles of silicon compound characterized by including: preparing particles of negative electrode active material containing particles of silicon compound containing a silicon compound ($SiO_x: 0.5 \leq x \leq 1.6$); and selecting particles of negative electrode active material that contain crystalline $Li_2SiO_3$ in at least a part thereof and satisfy the following formula 1 and formula 2 between an intensity A of a peak derived from $Li_2SiO_3$, an intensity B of a peak derived from Si, an intensity C of a peak derived from $Li_2Si_2O_5$, and an intensity D of a peak derived from $SiO_2$, which are obtained from a $^{29}Si$-MAS-NMR spectrum, from the particles of negative electrode active material, wherein a negative electrode active material is produced with the selected particles of negative electrode active material.

$$A > B > D \quad (1)$$

$$A > C > D \quad (2)$$

When the negative electrode active material is produced by selecting thus the particles of silicon-based active material, the negative electrode active material having high capacity, excellent cycle characteristics and initial charge/discharge characteristics when used as the negative electrode active material of the lithium ion secondary battery may be produced.

Furthermore, in order to achieve the object, the present invention provides a production method of the lithium ion secondary battery characterized by preparing a negative electrode using the negative electrode active material produced according to the production method of the negative electrode active material, and by producing a lithium ion secondary battery with the prepared negative electrode.

A lithium ion secondary battery having high capacity and excellent cycle characteristics and initial charge/discharge characteristics may be produced by using the negative electrode active material produced as described above.

Advantageous Effects of Invention

The negative electrode active material of the present invention may obtain high capacity and excellent cycle characteristics and initial charge/discharge characteristics when used as the negative electrode active material of secondary battery. Furthermore, similar effect may be obtained also in the mixed negative electrode active material, the negative electrode, and the lithium ion secondary battery, which contain the negative electrode active material. Furthermore, according to the production method of negative electrode active material of the present invention, a negative electrode active material having excellent cycle characteristics and initial charge/discharge characteristics may be produced when used as the negative electrode active material of the secondary battery.

DESCRIPTION OF EMBODIMENTS

In what follows, embodiments of the present invention will be described. However, the present invention is not limited thereto.

As was described above, as one of methods for increasing the battery capacity of the lithium ion secondary battery, it has been studied to use a negative electrode that uses a silicon-based active material as a main material. The lithium ion secondary battery that uses the silicon-based active material is desired to have the initial charge/discharge characteristics and cycle characteristics close to the same as the lithium ion secondary battery that uses the carbon-based active material. However, a silicon-based active material that shows the initial efficiency and cycle stability equivalent with the lithium ion secondary battery that uses the carbon-based active material has not been proposed.

There, the present inventors have conducted intensive studies to obtain a negative electrode active material that has high battery capacity, and excellent cycle characteristics and initial efficiency when used in a secondary battery, and came to the present invention.

The negative electrode active material of the present invention contains particles of negative electrode active material. And the particles of negative electrode active material contain the particles of silicon compound containing a silicon compound ($SiO_x$: $0.5 \leq x \leq 1.6$). The particles of negative electrode active material contain crystalline $Li_2SiO_3$ in at least a part thereof, and an intensity A of a peak derived from $Li_2SiO_3$, an intensity B of a peak derived from Si, an intensity C of a peak derived from $Li_2Si_2O_5$, and an intensity D of a peak derived from $SiO_2$, which are obtained from a $^{29}$Si-MAS-NMR spectrum satisfy the following formula 1 and formula 2.

$$A > B > D \tag{1}$$

$$A > C > D \tag{2}$$

The negative electrode active material of the present invention may improve the battery capacity because of containing the negative electrode active material that contains particles of negative electrode active material. Furthermore, the irreversible capacity generated during charge may be reduced because $SiO_2$ a part of which reacts with lithium during charge of the secondary battery to be an irreversible component is modified in advance to lithium silicate. Furthermore, when the particles of negative electrode active material satisfy the formula 1 or the formula 2, it may be said that $SiO_2$ contained in the particles of negative electrode active material is less on the basis of $Li_2SiO_3$ and Si, or $SiO_2$ is less on the basis of $Li_2SiO_3$ and $Li_2Si_2O_5$. Therefore, the initial efficiency and cycle characteristics of the battery may be improved. Furthermore, when the A>B is satisfied like in the formula 1, the irreversible capacity of the battery is reduced because it may be said that a majority of $SiO_2$ is modified to $Li_2SiO_3$. Furthermore, when the B>D is satisfied like in the formula 1, higher battery capacity is obtained because it may be said that Si that occludes lithium during charge of the battery is present sufficiently. Still furthermore, when the A>C is satisfied like in the formula 2, the stability to the aqueous slurry used during preparation of the electrode is improved and the cycle characteristics of the battery are also improved because it may be said that stable $Li_2SiO_3$ is present more abundant than unstable $Li_2Si_2O_5$ that is easily eluted into the aqueous slurry among lithium silicates obtained by changing $SiO_2$. Furthermore, when satisfying the A>C and further satisfying the C>D like in the formula 2, a negative electrode active material that is stable and may reduce the irreversible capacity due to $SiO_2$ is obtained.

<Negative Electrode for Nonaqueous Electrolyte Secondary Battery>

Figure 1:
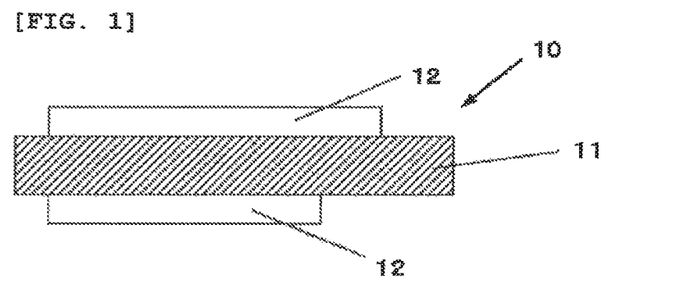
FIG. 1 is a cross-sectional diagram showing a configuration of a negative electrode for lithium ion secondary battery of the present invention.

First, a negative electrode for nonaqueous electrolyte secondary battery will be described. FIG. 1 shows a cross-sectional configuration of a negative electrode for nonaqueous electrolyte secondary battery (hereinafter, referred to also as "negative electrode") in one embodiment of the present invention.

[Configuration of Negative Electrode]

As shown in FIG. 1, a negative electrode 10 is configured to have a negative electrode active material layer 12 on a negative electrode current collector 11. The negative electrode active material layer 12 may be formed on both surfaces or only on one surface of the negative electrode current collector 11. Furthermore, when a negative electrode active material of the present invention is used, the negative electrode current collector 11 may not be used.

[Negative Electrode Current Collector]

The negative electrode current collector 11 is configured of a substance that is an excellent electrically conductive material and has excellent mechanical strength. As the electrically conductive materials that may be used for the negative electrode current collector 11, for example, copper (Cu) or nickel (Ni) may be used. It is preferable that the electrically conductive material does not form an intermetallic compound with lithium (Li).

It is preferable that the negative electrode current collector 11 contains carbon (C) or sulfur (S) other than a main element. This is because the physical strength of the negative electrode current collector may be improved. In particular, in the case where an active material layer that expands during charge is included, deformation of the electrode including the current collector may be suppressed when the current collector includes the elements. Although contents of the elements are not particularly limited, among these, each is preferably 100 mass ppm or less. This is because higher deformation suppression effect is obtained. Due to the deformation suppression effect like this, the cycle characteristics may be further improved.

Furthermore, a surface of the negative electrode current collector 11 may be roughened or may not be roughened. The roughened negative electrode current collector is a metal foil treated by, for example, an electrolytic treatment, an embossing treatment, or a chemical etching treatment. The negative electrode current collector that is not roughened is, for example, a rolled metal foil.

[Negative Electrode Active Material Layer]

The negative electrode active material layer 12 contains a negative electrode active material of the present invention capable of occluding/emitting lithium ions, and, from the viewpoint of battery design, may further contain other materials such as a negative electrode binder or a conductive assistant. The negative electrode active material contains particles of negative electrode active material, and the particles of negative electrode active material contain particles of silicon compound containing a silicon compound ($SiO_x$: $0.5 \leq x \leq 1.6$).

Furthermore, the negative electrode active material layer 12 may contain a mixed negative electrode active material that contains the negative electrode active material (silicon-based negative electrode active material) of the present invention and a carbon-based active material. Electric resistance of the negative electrode active material layer is lowered thereby, and the expansion stress accompanying the charge may be alleviated. Examples of the carbon-based active material include pyrolytic carbons, cokes, glass-like carbon fibers, organic polymer compound sinters, and carbon blacks.

Furthermore, it is preferable that the negative electrode of the present invention has a ratio of a mass of the silicon-based negative electrode active material to a sum total of masses of the silicon-based negative electrode active material and the carbon-based active material of 6% by mass or more. When the ratio of the mass of the negative electrode active material of the present invention to a sum total of masses of the silicon-based negative electrode active material and the carbon-based active material is 6% by mass or more, the battery capacity may be surely improved.

Furthermore, the negative electrode active material of the present invention such as described above contains particles of silicon compound, the particles of silicon compound are a silicon oxide material containing a silicon compound ($SiO_x$: $0.5 \leq x \leq 1.6$), the composition thereof preferably has "x" closer to 1. This is because high cycle characteristics may be obtained. It is to be noted that the composition of the silicon compound in the present invention does not necessarily mean a purity of 100%, but may contain a slight amount of impurities.

Furthermore, in the negative electrode active material of the present invention, the particles of silicon compound may further contain $Li_4SiO_4$ in addition to crystalline $Li_2SiO_3$. The lithium silicate like this is obtained by modifying in advance a $SiO_2$ component part that becomes unstable during insertion/desorption of the lithium during the charge/discharge of the battery in the silicon compounds to another silicate, therefore the irreversible capacity being generated during the charge may be reduced.

Furthermore, the battery characteristics are more improved when $Li_4SiO_4$ and $Li_2SiO_3$ coexist in the inside of a bulk of the particles of silicon compound. It is to be noted that these lithium silicates may be quantified by NMR (Nuclear Magnetic Resonance) or XPS (X-ray photoelectron spectroscopy). Measurements of XPS and NMR are performed, for example, under the following conditions.

XPS

Device: X-ray photoelectron spectrometer,
  X-ray source: monochromatic Al—K alpha line,
  X-ray spot diameter: 100 μm, and
  Ar ion gun sputtering condition: 0.5 kV/2 mm×2 mm.

$^{29}Si$ MAS NMR (magic angle rotation nuclear magnetic resonance)

Device: 700 NMR Spectrometer produced by Bruker Inc.,
  Probe: 4 mm HR-MAS Rotor 50 μL,
  Sample revolving speed: 10 kHz, and
  Measurement environment temperature: 25°.

Furthermore, in the present invention, it is preferable that the particles of negative electrode active material have a peak in the vicinity of −130 ppm as the chemical shift value obtained from the $^{29}Si$-MAS-NMR spectrum. A peak of which chemical shift value is obtained at a position in the vicinity of −130 ppm is assumed as a peak derived from amorphous silicon. When the peak derived from the amorphous silicon is detected thus, the negative electrode active material that may improve the initial efficiency and cycle characteristics of the secondary battery is obtained because it may be said that the $SiO_2$ is more sufficiently modified.

Furthermore, in the present invention, it is preferable that the particles of negative electrode active material have a peak in −40 to −60 ppm as the chemical shift value obtained from the $^{29}Si$-MAS-NMR spectrum. Also a peak appeared in the range of −40 to −60 ppm as the chemical shift value is a peak derived from the amorphous silicon. Therefore, in the same manner as the above, the negative electrode active material that may improve the initial efficiency and cycle characteristics of the secondary battery is obtained.

Figure 3:
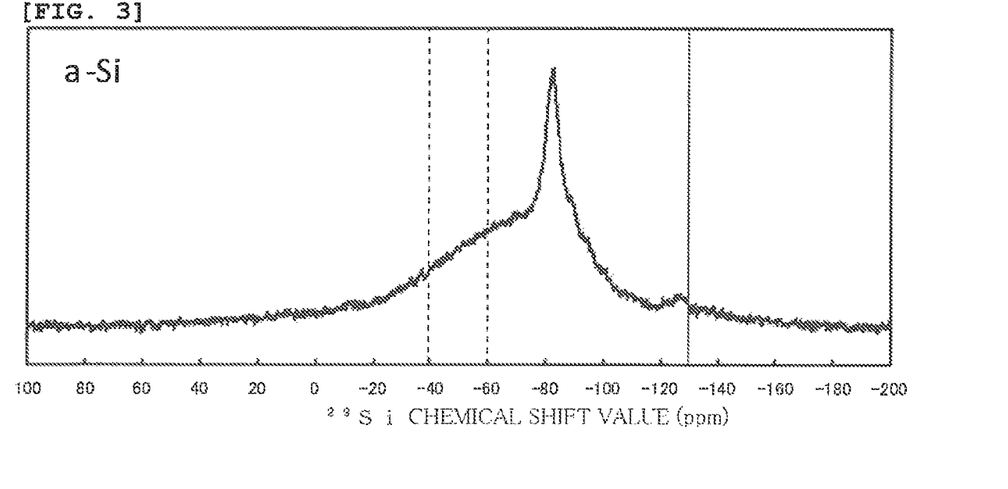
FIG. 3 is one example of a spectrum obtained when $SiO_x$ containing amorphous silicon was measured with $^{29}$Si-MAS-NMR.

It is to be noted that one example of a peak derived from the amorphous silicon is shown in FIG. 3. As shown in FIG. 3, the peak derived from the amorphous silicon appears as a mild peak in the region where the chemical shift value of the $^{29}Si$-MAS-NMR spectrum is −40 to −60 ppm. Furthermore, the chemical shift value derived from the amorphous silicon appears also at a position in the vicinity of −130 ppm.

Furthermore, it is preferable that the particles of silicon compound have a half-value width ($2\theta$) of a diffraction peak due to a Si (111) crystal plane obtained by X-ray diffractometry of 1.20 or more and a crystallite size corresponding to the crystal plane of 7.5 nm or less. The lower the silicon crystallinity of the silicon compound in the particles of silicon compound is, the better, in particular, when an abundance of Si crystals is small, the battery characteristics may be improved, furthermore, a stable Li compound may be generated.

Furthermore, in the negative electrode active material of the present invention, it is preferable that the particles of negative electrode active material contain a carbon material in a superficial layer part. When the particles of negative electrode active material contain the carbon material in the superficial part thereof, the electric conductivity may be improved. Therefore, when the negative electrode active material containing the particles of negative electrode active material like this is used as the negative electrode active material of the secondary battery, the battery characteristics may be improved.

Furthermore, it is preferable that an average thickness of the carbon material of the superficial layer part of the particles of negative electrode active material is 10 nm or more and 5000 nm or less. When the average thickness of the carbon material is 10 nm or more, the electric conductivity may be improved, and in the case where the average thickness of the carbon material to be coated is 5000 nm or less, the battery capacity may be suppressed from decreasing when the negative electrode active material containing the particles of negative electrode active material like this is used as the negative electrode active material of the lithium ion secondary battery.

An average thickness of the carbon material may be calculated according to, for example, the following procedure. First, the particles of negative electrode active material are observed at an arbitrary magnification by TEM (transmission type electron microscope). It is preferable that the magnification is a magnification that allows visual confirmation of a thickness of the carbon material such that the thickness may be measured. Subsequently, at optional 15 points, the thickness of the carbon material is measured. In this case, it is preferable to set measurement positions broadly and at random without concentrating on particular positions as much as possible. Last, an average value of the thicknesses of the carbon material at the 15 points is calculated.

Although a coverage of the carbon material is not particularly limited, the coverage is desirably as much as large. When the coverage is 30% or more, it is preferable because the electric conductivity is further improved. Although a covering method of the carbon material is not particularly limited, a sugar carbonization method and a pyrolysis method of hydrocarbon gas are preferred. It is because a coverage factor may be improved.

Furthermore, it is preferable that a median diameter ($D_{50}$: a particle size when a cumulative volume becomes 50%) of the particles of negative electrode active material is 1.0 μm or more and 15 μm or less. This is because when the median diameter is within the above range, lithium ions become easy to be occluded/emitted during charge/discharge and crack of the particles becomes difficult to occur. When the median diameter is 1.0 μm or more, a surface area a mass may be made smaller, and an increase in the battery irreversible capacity may be suppressed. On the other hand, when the median diameter is set to 15 μm or less, a new surface is difficult to appear because the particles become difficult to be cracked.

Furthermore, when a test cell formed of a negative electrode containing a mixture of the silicon-based active material and the carbon-based active material and a counter electrode lithium is prepared, in the test cell, charge/discharge formed of charge that flows a current such that lithium is inserted in the silicon-based active material and discharge that flows a current such that the lithium is desorbed from the silicon-based active material is repeated 30 times, and a graph showing a relationship between a differential value dQ/dV obtained by differentiating a discharge capacity Q in each charge/discharge by a potential V of the negative electrode based on the counter electrode lithium and the potential V is depicted, the negative electrode active material (silicon-based active material) of the present invention preferably has a peak in the range of 0.40 to 0.55 V of a potential V of the negative electrode during the discharge at X times and after ($1 \leq X \leq 30$). The peak in a V-dQ/dV curve is similar to the peak of the silicon material, and, when designing a battery, capacity is readily developed, since a discharge curve on a higher potential side rises up sharply. Furthermore, when the negative electrode active material develops the peak within 30 times of charge/discharge, it may be judged that a stable bulk is formed.

Furthermore, as a negative electrode binder contained in the negative electrode active material layer, at least any one kind or more of, for example, a polymer material, a synthetic rubber and so on may be used. Examples of the polymer materials include polyvinylidene fluoride, polyimide, polyamide-imide, aramid, polyacrylic acid, lithium polyacrylate, and carboxymethylcellulose. Examples of the synthetic rubbers include styrene-butadiene rubbers, fluoro-rubbers, and ethylene propylene diene.

As the negative electrode conductive assistant, any one kind or more of carbon materials such as carbon black, acetylene black, graphite, Ketjen black, carbon nanotube, carbon nanofiber and the like may be used.

The negative electrode active material layer may be formed by, for example, a coating method. The coating method is a method in which after the particles of negative electrode active material and the binder, further, as needs arise, a conductive assistant, and a carbon material are mixed, followed by dispersing in an organic solvent or water, further followed by coating.

The negative electrode may be formed according to, for example, the following procedure. First, a production method of a negative electrode active material used in the negative electrode will be described. In the beginning, particles of negative electrode active material containing particles of silicon compound containing a silicon compound ($SiO_x$: $0.5 \leq x \leq 1.6$) are prepared. Thereafter, from the particles of negative electrode active material, particles of negative electrode active material that contain crystalline $Li_2SiO_3$ in at least a part thereof and satisfy the following formula 1 and formula 2 between an intensity A of a peak derived from $Li_2SiO_3$, an intensity B of a peak derived from Si, an intensity C of a peak derived from $Li_2Si_2O_5$, and an intensity D of a peak derived from $SiO_2$, which are obtained from the $^{29}$Si-MAS-NMR spectra are selected. Then, with the selected particles of negative electrode active material, a negative electrode active material is produced.

$$A > B > D \tag{1}$$

$$A > C > D \tag{2}$$

Furthermore, in order to prepare the particles of negative electrode active material, further, coating a carbon material on the particles of silicon compound may be provided. The particles of negative electrode active material on a surface of which a carbon material is coated have excellent electric conductivity.

More specifically, the negative electrode active material may be produced as shown below. At the beginning, a raw material that generates silicon oxide gas is heated under presence of inert gas, under reduced pressure, and in the temperature range of from 900° C. to 1600° C. to generate silicon oxide gas. When considering a surface oxygen of metallic silicon powder and a slight amount of oxygen in a reaction furnace, a mixing molar ratio is desirably in the range of 0.8n<metallic silicon powder/silicon dioxide powder<1.3.

Generated silicon oxide gas is solidified and deposited on an adsorption plate. Then, with a temperature inside a reaction furnace lowered to 100° C. or less, a deposit of silicon oxide is taken out, followed by crushing, pulverizing with a ball mill or a jet mill. As was described above, particles of silicon compound may be produced. It is to be noted that Si crystallites in the particles of silicon compound may be controlled by changing a vaporization temperature, or heat treatment after generation.

Here, a layer of the carbon material may be formed on a superficial layer of the particles of silicon compound. As a method of forming the layer of carbon material, a thermal decomposition CVD method is desirable. A method of generating the layer of carbon material by the thermal decomposition CVD method will be described.

First, the particles of silicon compound are set in a furnace. Next, hydrocarbon gas is introduced into the furnace, and an internal temperature of furnace is elevated. Although a decomposition temperature is not particularly limited, 1200° C. or less is desirable, and 950° C. or less is more desirable. When the decomposition temperature is set to 1200° C. or less, unintentional disproportionation of the particles of silicon compound may be suppressed. After elevating the internal temperature of furnace to a predetermined temperature, a carbon layer is generated on a surface of the particles of silicon compound. Thus, the particles of negative electrode active material may be produced. Furthermore, the hydrocarbon gas that becomes a raw material of the carbon material is, though not particularly limited, desirable to be n≤3 in a $C_nH_m$ composition. In the case of n≤3, a production cost may be lowered, and, the physical properties of a decomposition product is made excellent.

Next, Li may be inserted to modify the particles of negative electrode active material prepared as shown above. At this time, lithium silicates such as crystalline $Li_2SiO_3$ and $Li_4SiO_4$ may be contained in the particles of negative electrode active material.

It is preferable to insert Li by the thermal doping method. In this case, it is possible to modify by mixing, for example, the particles of negative electrode active material with a LiH powder or a Li powder, followed by heating under a non-oxidizing atmosphere. As the non-oxidizing atmosphere, for example, an Ar atmosphere may be used. More specifically, first, under the Ar atmosphere, the LiH powder or Li powder and a silicon oxide powder are thoroughly mixed, followed by sealing, further followed by stirring the sealed vessel as a whole to homogenize. Thereafter, the mixture is heated in the range of from 700° C. to 750° C. to modify. Furthermore, at this time, when the Li is desorbed from the silicon compound, the heated powder is sufficiently cooled, followed by cleansing with alcohol, alkali water, weak acid or pure water.

Furthermore, the insertion of Li may be performed also by a redox method. In the modification due to the redox method, for example, first, by soaking the particles of negative electrode active material in a solution A in which lithium is dissolved in an ether solvent, the lithium may be inserted. In the solution A, a polycyclic aromatic compound or a straight chain polyphenylene compound may be further contained. After the insertion of Li, when the particles of negative electrode active material are soaked in a solution B containing a polycyclic aromatic compound or a derivative thereof, active lithium may be desorbed from the particles of negative electrode active material. Examples of solvents of the solution B include ether-based solvents, ketone-based solvents, ester-based solvents, alcohol-based solvents, amine-based solvents, or mixed solvents thereof. Furthermore, after soaking in the solution B, when the particles of negative electrode active material are soaked in a solution C containing the alcohol-based solvent, a carboxylic acid-based solvent, water, or mixed solvent thereof, more abundant active lithium may be desorbed from the particles of negative electrode active material. Furthermore, in place of the solution C, a solution C' that contains a compound having a quinoid structure in a molecule as a solute, and contains the ether-based solvent, the ketone-based solvent, the ester-based solvent, or mixed solvent thereof as the solvent may be used. Furthermore, soaking of the particles of negative electrode active material in the solutions B, C and C' may be repeated. Thus, when the active lithium is desorbed after insertion of lithium, the negative electrode active material having higher water resistance is formed. After that, a method of cleaning with alcohol, alkali water in which lithium carbonate is dissolved, weak acid, or pure water may be applied.

Furthermore, when two modification methods are applied to modify, the modification is more forwarded, and a negative electrode active material of which battery characteristics are improved may be prepared. More specifically, it is more preferable to modify, first, by the thermal doping method, and after that, to modify by the redox method. In this case, it is possible that a silicon dioxide part of which modification by the thermal doping method is insufficient is selectively modified by the redox method.

Next, from the modified particles of negative electrode active material, particles that contain crystalline $Li_2SiO_3$ in at least a part thereof and satisfy the following formula 1 and formula 2 between an intensity A of a peak derived from $Li_2SiO_3$, an intensity B of a peak derived from Si, an intensity C of a peak derived from $Li_2Si_2O_5$, and an intensity D of a peak derived from $SiO_2$, which are obtained from the $^{29}$Si-MAS-NMR spectra are selected.

$$A>B>D \tag{1}$$

$$A>C>D \tag{2}$$

A measurement due to $^{29}$Si-MAS-NMR may be carried out under the following condition.

$^{29}$Si MAS NMR

Device: 700 NMR Spectrometer produced by Bruker Inc.,
Probe: 4 mm HR-MAS Rotor 50 μL,
Sample revolving speed: 10 kHz, and
Measurement environment temperature: 25°.

Furthermore, in the $^{29}$Si-MAS-NMR spectrum, a peak of which chemical shift value appears at a position in the vicinity of 72 to −75 ppm is a peak derived from $Li_2SiO_3$, and a peak of which chemical shift value appears in the vicinity of −83 ppm is a peak derived from Si. Furthermore, a peak of which chemical shift value appears in the vicinity of −93 ppm is a peak derived from $Li_2Si_2O_5$, and a peak that appears in the vicinity of −110 ppm is a peak derived from $SiO_2$.

It is to be noted that a peak derived from a silicate other than $Li_2SiO_3$ and $Li_4SiO_4$ may appear over from −80 to −100 ppm. Other than these, a peak derived from $Li_4SiO_4$ may appear in the vicinity of −63 ppm.

An intensity of a peak is expressed by a height of a peak from a base line calculated from a $^{29}$Si-MAS-NMR spectrum. At this time, the base line may be determined according to a normal method.

There is a case where a peak in the vicinity of 72 to −75 ppm derived from $Li_2SiO_3$ does not have a maximal value. At this time, a peak intensity A is taken as the maximum value of the intensity of a spectrum of −72 ppm. Furthermore, when the peak in the vicinity of −83 ppm derived from Si does not have a maximal value, a peak intensity B is taken as an intensity at −83 ppm. Still furthermore, the peak in the vicinity of −93 ppm derived from $Li_2Si_2O_5$ does not have a maximal value, a peak intensity C is taken as an intensity at −93 ppm. Furthermore, when a peak in the vicinity of −110 ppm derived from $SiO_2$ does not have the maximal value, a peak intensity D is taken as an intensity at −110 ppm.

It is to be noted that the selection of the particles of negative electrode active material is not necessarily performed every time when producing the negative electrode active material, that is, when selecting by finding production conditions satisfying the formula 1 and formula 2, after that, the negative electrode active material may be produced under the same conditions as the selected conditions.

After mixing the negative electrode active material prepared as shown above with other materials such as a negative electrode binder and a conductive assistant to form a negative electrode mixture, an organic solvent or water is added to form a slurry. Next, the slurry is coated on a surface of the negative electrode current collector and dried to generate a negative electrode active material layer. At this time, as needs arise, hot pressing or the like may be applied. Furthermore, when the negative electrode current collector contains carbon and sulfur each at 100 ppm or less, an effect of suppressing deformation of the negative electrode may be obtained. Thus, the negative electrode may be prepared.

<Lithium Ion Secondary Battery>

Next, a lithium ion secondary battery of the present invention will be described. The lithium ion secondary battery of the present invention uses a negative electrode that contains the negative electrode active material of the present invention. Here, as a specific example, a laminate film type lithium ion secondary battery is cited as an example.

[Configuration of Laminate Film Type Lithium Ion Secondary Battery]

Figure 2:
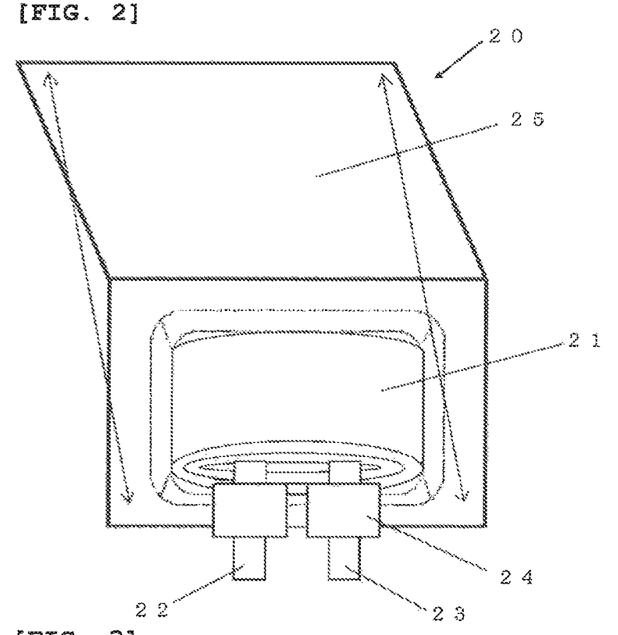
FIG. 2 is a diagram showing a configurational example (laminate film type) of the lithium ion secondary battery of the present invention.

A laminate film type lithium ion secondary battery 20 shown in FIG. 2 houses a wound electrode body 21 mainly inside a sheet-like exterior member 25. The wound body has a separator between a positive electrode and a negative electrode and is formed by winding. Furthermore, there is a case where the positive electrode and the negative electrode have a separator therebetween and house a laminate body. In either of electrode bodies, a positive electrode lead 22 is attached to the positive electrode, and a negative electrode lead 23 is attached to the negative electrode. An outermost peripheral part of the electrode body is protected by a protective tape.

The positive and negative electrode leads are led in one direction, for example, from the inside of the exterior member 25 toward an outside thereof. The positive electrode lead 22 is made of an electrically conductive material such as aluminum or the like, and the negative electrode lead 23 is made of an electrically conductive material such as nickel, copper or the like.

The exterior member 25 is a laminate film in which, for example, a fusion layer, a metal layer, and a surface protective layer are laminated in this order, and, the laminate film has outer peripheral parts fused with each other or adhered by an adhesive in a fusion layer of two sheets of film such that the fusion layers may face with the wound electrode body 21. The fusion part is a film such as polyethylene or polypropylene, and the metal part is an aluminum foil or the like. The protective layer is, for example, nylon or the like.

An adhesive film 24 is inserted between the exterior member 25 and the positive and negative electrode leads to prevent outer air from intruding. The material is, for example, a polyethylene, polypropylene, or polyolefin resin.

[Positive Electrode]

A positive electrode has a positive electrode active material layer on both sides or on one side of a positive electrode current collector in the same manner as in the negative electrode 10 of, for example, FIG. 1.

The positive electrode current collector is made of an electrically conductive material such as aluminum or the like.

A positive electrode active material layer contains any one or more kinds of positive electrode materials capable of occluding/emitting lithium ions, and, may contain other materials such as a binder, a conductive assistant, and a dispersant depending on a design. In this case, details of the binder and the conductive assistant are the same as the negative electrode binder and the negative electrode conductive assistant described above.

As the positive electrode material, a Li-containing compound is desirable. As the Li-containing compound, a composite oxide made of, for example, lithium and a transition metal element, or a phosphate compound having the Li and the transition metal element may be used. Among these positive electrode materials, compounds containing at least one or more kinds of nickel, iron, manganese, and cobalt are preferred. Chemical formulas for these are represented by, for example, $Li_xM1O_2$ or $Li_yM2PO_4$. In the formulas, M1 and M2 represent at least one or more kinds of the transition metal elements. Values of "x" and "y" show different values depending on a battery charge/discharge state, but, are generally shown by $0.05 \leq x \leq 1.10$ and $0.05 \leq y \leq 1.10$.

As the composite oxide containing the lithium and the transition metal element, for example, a lithium-cobalt composite oxide ($Li_xCoO_2$), a lithium-nickel composite oxide ($Li_xNiO_2$) may be used. As the phosphate compound having the lithium and the transition metal element, for example, a lithium-iron phosphate compound ($LiFePO_4$) or a lithium-iron-manganese phosphate compound ($LiFe_{1-u}Mn_uPO_4$ ($0<u<1$)) may be used. This is because when these positive electrode materials are used, high battery capacity may be obtained and excellent cycle characteristics may be also obtained.

[Negative Electrode]

A negative electrode has the same configuration as the negative electrode 10 for lithium ion secondary battery of the FIG. 1, and has a negative electrode active material layer 12, for example, on both sides of the current collector 11. The negative electrode preferably has a negative electrode charge capacity larger than an electric capacity (charge capacity as a battery) obtained from a positive electrode active material agent. This is because the precipitation of the lithium metal on the negative electrode may be suppressed.

The positive electrode active material layer is provided on a part of both sides of the positive electrode current collector, and the negative electrode active material layer is also provided on a part of both sides of the negative electrode current collector. In this case, the negative electrode active material layer provided on, for example, the negative electrode current collector is provided on a region where an opposing positive electrode active material layer is not present. This is because stable battery design is carried out.

A non-facing region, that is, a region where the negative electrode active material layer and the positive electrode active material layer do not face each other is hardly influenced by the charge/discharge. Therefore, a state of the negative electrode active material layer just as immediately after the formation is maintained. Thereby, a composition of the negative electrode active material or the like may be accurately investigated with excellent reproducibility irrespective of the presence or non-presence of the charge/discharge.

[Separator]

The separator separates the positive electrode and the negative electrode and allows passage of lithium ions while preventing current short-circuit accompanying the contact of both electrodes from occurring. The separator is formed of a porous film made of, for example, a synthetic resin, or ceramic, and may have a laminate structure in which two or more kinds of porous films are laminated. Examples of the synthetic resin include polytetrafluoroethylene, polypropylene, polyethylene and the like.

[Electrolytic Solution]

At least a part of the active material layer or the separator is impregnated with a liquid electrolyte (electrolytic solution). The electrolytic solution has an electrolyte salt dissolved in a solvent and may contain other materials such as an additive or the like.

As the solvent, for example, a nonaqueous solvent may be used. Examples of the nonaqueous solvents include ethylene carbonate, propylene carbonate, butylene carbonate, dimethyl carbonate, diethyl carbonate, ethyl methyl carbonate, methyl propyl carbonate, 1,2-dimethoxy ethane, tetrahydrofuran and the like. Among these, it is desirable to use at least one or more kinds of ethylene carbonate, propylene carbonate, dimethyl carbonate, diethyl carbonate, and ethyl methyl carbonate. This is because more excellent characteristics may be obtained. Furthermore, in this case, more advantageous characteristics may be obtained by combining a high viscosity solvent such as ethylene carbonate, propylene carbonate or the like and a low viscosity solvent such as dimethyl carbonate, ethyl methyl carbonate, diethyl carbonate or the like. This is because dissociability or ionic mobility of the electrolyte salt is improved.

When an alloy-based negative electrode is used, it is desirable to contain, in particular as a solvent, at least one kind of a halogenated linear carbonic ester or a halogenated cyclic carbonic ester. Thus, during charge/discharge, in particular during charge, a stable film is formed on a surface of the negative electrode active material. Here, the halogenated linear carbonic ester is a linear carbonic ester having a halogen as a constituent element (at least one hydrogen is substituted with a halogen). Furthermore, the halogenated cyclic carbonic ester is a cyclic carbonic acid ester having a halogen as a constituent element (that is, at least one hydrogen is substituted with a halogen).

Although a kind of the halogen is not particularly limited, fluorine is preferable. This is because a higher-quality film than other halogens may be formed. Furthermore, the larger the number of halogens is, the more desirable. This is because an obtained film is more stable, and a decomposition reaction of the electrolytic solution is reduced.

Examples of the halogenated linear carbonic esters include carbonic acid fluoromethylmethyl ester and carbonic acid difluoromethylmethyl ester. Examples of the halogenated cyclic carbonic esters include 4-fluoro-1,3-dioxolane-2-one, 4,5-difluoro-1,3-dioxolane-2-one and the like.

It is preferable to contain an unsaturated carbon bond cyclic carbonic ester as a solvent additive. This is because a stable film is formed on a surface of the negative electrode during charge/discharge to be able to suppress a decomposition reaction of the electrolytic solution. Examples of the unsaturated carbon bond cyclic carbonic ester include, for example, vinylene carbonate and vinyl ethylene carbonate.

Furthermore, it is preferable to contain a sultone (cyclic sulfonic acid ester) as the solvent additive. This is because the chemical stability of the battery is improved. Examples of the sultone include propane sultone and propene sultone.

Furthermore, the solvent preferably contains an acid anhydride. This is because the chemical stability of the electrolytic solution is improved. As the acid anhydride, for example, propane disulfonic acid anhydride may be used.

The electrolyte salt may contain any one or more kinds of light metal salts such as lithium salts. As the lithium salt, for example, lithium hexafluorophosphate ($LiPF_6$), lithium tetrafluoroborate ($LiBF_4$) or the like may be used.

A content of the electrolyte salt is preferably 0.5 mol/kg or more and 2.5 mol/kg or less relative to the solvent. This is because high ionic conductivity is obtained.

(Production Method of Laminate Film Type Secondary Battery)

In the present invention, a negative electrode is prepared with the negative electrode active material produced according to a production method of the negative electrode active material of the present invention, and with the prepared negative electrode, a lithium ion secondary battery is produced.

At the beginning, a positive electrode is prepared with the above positive electrode material. First, a positive electrode mixture is formed by mixing the positive electrode active material and, as needs arise, a binder and a conductive assistant, followed by dispersing in an organic solvent to form a positive electrode mixture slurry. Subsequently, the mixture slurry is coated on the positive electrode current collector by a coating device such as a knife roll or a die coater with a die head and dried with hot air to obtain a positive electrode active material layer. At the end, the positive electrode active material layer is compression molded by a roll press machine or the like. At this time, heating may be applied, or, heating or compression may be repeated a plurality of times.

Next, by using the same operation procedure as in the preparation of the negative electrode 10 for lithium ion secondary battery, the negative electrode active material layer is formed on the negative electrode current collector to form a negative electrode.

When preparing the positive electrode and the negative electrode, the respective active material layer is formed on both sides of the positive electrode and the negative electrode current collectors. At this time, in any of the electrodes, active material coating lengths on the both surface parts may be displaced (see FIG. 1).

Subsequently, an electrolytic solution is prepared. Further subsequently, by using ultrasonic welding or the like, the positive electrode lead 22 is attached to the positive electrode current collector and the negative electrode lead 23 is attached to the negative electrode current collector as shown in FIG. 2. Then, the positive electrode and the negative electrode are laminated via the separator, or are wound to prepare a wound electrode body 21, followed by adhering a protective tape to the outermost peripheral part thereof. Next, the wound electrode body is molded into a flat shape. Then, after inserting the wound electrode body between folded film-like exterior member 25, insulation parts of the exterior member are adhered by a thermal fusion method with each other, and with only one direction opened, the wound electrode body is encapsulated. Then, an adhesive film is inserted between the positive electrode lead, and the negative electrode lead and the exterior member. A predetermined amount of the above prepared electrolytic solution is charged from a releasing part, followed by vacuum impregnation. After the impregnation, the releasing part is adhered by a vacuum thermal fusion method. As was described above, the laminate film type lithium ion secondary battery 20 may be produced.

EXAMPLES

In what follows, the present invention will be more specifically described with reference to Examples and Comparative Examples of the present invention. However, the present invention is not limited to these examples.

Example 1-1

According to the following procedure, a laminate film type lithium secondary battery 20 shown in FIG. 2 was prepared.

First, a positive electrode was prepared. A positive electrode mixture was prepared by mixing 95% by mass of $LiNi_{0.7}Co_{0.25}Al_{0.05}O$ that is lithium-nickel-cobalt composite oxide (NCA) as a positive electrode active material, 2.5% by mass of a positive electrode conductive assistant, and 2.5% by mass of a positive electrode binder (polyvinylidene fluoride: PVDF). Subsequently, the positive electrode mixture was dispersed in an organic solvent (N-methyl-2-pyllolydone: NMP) to form a paste-like slurry. Subsequently, the slurry was coated on both sides of a positive electrode current collector with a coating machine having a die head, followed by drying with a hot air type dryer. At this time, the positive electrode current collector having a thickness of 15 μm was used. At the end, a roll press was used to perform compression molding.

Next, a negative electrode was prepared. A negative electrode active material was prepared in the following manner. A raw material in which metallic silicon and silicon dioxide are mixed was introduced into a reaction furnace, what was vaporized in an atmosphere having a degree of vacuum of 10 Pa was deposited on an adsorption plate, after sufficiently cooling, a deposit was taken out and pulverized by a ball mill. A value of "x" of $SiO_x$ of particles of silicon compound obtained like this was 1.0. Then, a particle size of the particles of silicon compound was adjusted by classification. Thereafter, a carbon film was coated on a surface of the particles of silicon compound by performing thermal CVD. This was used as the particles of negative electrode active material.

Subsequently, lithium was inserted into the particles of negative electrode active material by a thermal doping method to modify. First, a LiH powder of a mass corresponding to 4% by mass to the particles of negative electrode active material (particles of silicon compound coated with a carbon material) was mixed with the particles of negative electrode active material under an Ar atmosphere, followed by stirring with a shaker. After that, the stirred powder was heated at 740° C. to modify in an atmosphere-controlled furnace.

After the modification, the particles of negative electrode active material were cleansed with alcohol, alkali water, weak acid or water.

The particles of negative electrode active material thus prepared contained crystalline $Li_2SiO_3$.

Figure 4:
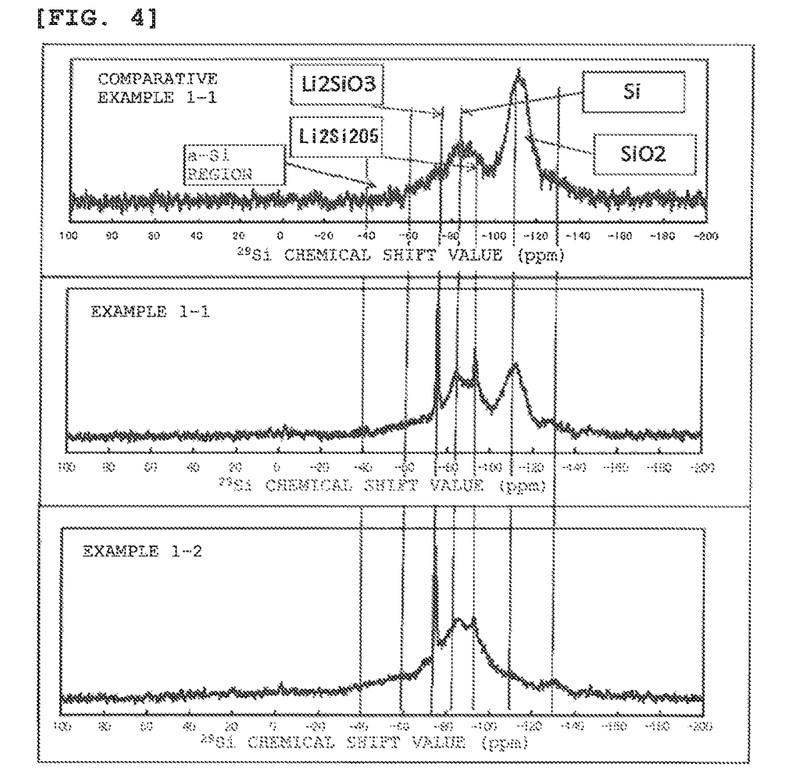
FIG. 4 shows $^{29}$Si-MAS-NMR spectra measured in Example 1-1, Example 1-2 and Comparative Example 1-1.

Here, when the particles of negative electrode active material (particles of silicon-based active material) prepared according to Example 1-1 were measured by $^{29}$Si-MAS-NMR, a spectrum like FIG. 4 was obtained. When peak intensities were calculated by setting a base line in the spectra of FIG. 4, an intensity A of a peak derived from $Li_2SiO_3$, an intensity B of a peak derived from Si, an intensity C of a peak derived from $Li_2Si_2O_5$, and an intensity D of a peak derived from $SiO_2$ satisfied the following formula 2 (A>C>D) but did not satisfy the formula 1 (A>D>B).

Furthermore, a peak was obtained also at a position where the chemical shift value is in the vicinity of −130 ppm as was obvious from FIG. 4. A mild peak was slightly found in the position where the chemical shift value is −40 to −60 ppm.

Subsequently, a mixed negative electrode active material was prepared by blending the particles of negative electrode active material and a carbon-based active material at a mass ratio of 1:9. Here, as the carbon-based active material, natural graphite coated with a pitch layer and artificial graphite were mixed at a mass ratio of 5:5 and used. Furthermore, a median diameter of the carbon-based active material was 20 μm.

Next, the prepared mixed negative electrode active material, a conductive assistant 1 (carbon nanotubes, CNT), a conductive assistant 2 (carbon fine particles having a median diameter of about 50 nm), a styrene-butadiene rubber (styrene-butadiene copolymer, hereinafter, referred to as SBR), and carboxymethylcellulose (hereinafter, referred to as CMC) were mixed at a dry mass ratio of 92.5:1:1:2.5:3, followed by diluting with pure water to prepare a negative electrode mixture slurry. It is to be noted that the SBR and CMC are negative electrode binders.

Furthermore, as a negative electrode current collector, an electrolytic copper foil having a thickness of 15 μm was used. The electrolytic copper foil contained carbon and sulfur each at a concentration of 100 mass ppm. At the end, the negative electrode mixture slurry was coated on the negative electrode current collector, followed by drying at 100° C.×1 hour in a vacuum atmosphere. After drying, a deposit amount of the negative electrode active material layer a unit area in one surface of the negative electrode (called also as area density) was 5 mg/cm².

Next, after solvents (4-fluoro-1,3-dioxolan-2-one (FEC), ethylene carbonate (EC) and dimethyl carbonate (DMC)) were mixed, an electrolyte salt (lithium hexafluorophosphate: $LiPF_6$) was dissolved to prepare an electrolytic solution. In this case, a composition of the solvent was set to FEC:EC:DMC=10:20:70 by volume ratio, and a content of the electrolyte salt was set to 1.2 mol/kg relative to the solvent.

Next, a secondary battery was assembled as shown below. At the beginning, an aluminum lead was ultrasonically welded to one end of the positive electrode current collector, and a nickel lead was welded to one end of the negative electrode current collector. Subsequently, the positive electrode, the separator, the negative electrode, and the separator were laminated in this order, and wound in the longitudinal direction to obtain a wound electrode body. A winding end part thereof was fixed with a PET protective tape. As the separator, a laminate film (thickness: 12 μm) in which a film having a porous polyethylene as a main component is sandwiched by a film having a porous polypropylene as a main component was used. Subsequently, after sandwiching the electrode body between the exterior members, outer periphery parts excluding one side were thermally fused each other and the electrode body was housed inside thereof.

As the exterior member, an aluminum laminated film in which a nylon film, an aluminum foil, and a polypropylene film are laminated was used. Subsequently, the prepared electrolytic solution was charged from an opening part and impregnated under a vacuum atmosphere, followed by the thermal fusion to seal.

The cycle characteristics and first time charge/discharge characteristics of the secondary battery prepared as shown above were evaluated.

The cycle characteristics were investigated as shown below. At the beginning, two cycles of charge/discharge were carried out at 0.2 C under the atmosphere of 25° C. for stabilizing the battery, and a discharge capacity at the second cycle was measured. Subsequently, the charge/discharge was performed until a total number of cycles becomes 499 cycles, and the discharge capacity was measured at each cycle. At the end, a capacity retention rate (hereinafter, referred to also simply as retention rate) was calculated by dividing the discharge capacity at the 500$^{th}$ cycles obtained under 0.2 C charge/discharge by the discharge capacity at the 2$^{nd}$ cycle. For normal cycles, that is, from 3$^{rd}$ cycle to 499$^{th}$ cycle, the charge/discharge was carried out at 0.7 C charge and 0.5 C discharge.

When investigating the first time charge/discharge characteristics, a first time efficiency (hereinafter, in some cases, referred to as initial efficiency) was calculated. The first time efficiency was calculated from a formula expressed by first time efficiency (%)=(first time discharge capacity/first time charge capacity)×100. The atmosphere and temperature were set to the same as in the case where the cycle characteristics were investigated.

Furthermore, from the negative electrode prepared as was described above and a counter electrode lithium, a coin battery type test cell of a 2032 size was prepared, and a discharge behavior thereof was evaluated. More specifically, first, at the counter electrode Li, a constant current and a constant voltage charge was performed up to 0 V, and, at the time point where the current density reached 0.05 mA/cm$^2$, the charge was stopped. After that, constant current discharge was performed up to 1.2 V. The current density at this time was 0.2 mA/cm$^2$. The charge/discharge was repeated 30 times, from the data obtained in each charge/discharge, a graph was depicted with a capacity variation rate (dQ/dV) on a vertical axis and a voltage (V) on a horizontal axis, and whether the V may obtain a peak in the range of from 0.4 to 0.55 (V) was confirmed. As a result thereof, in charge/discharge within 30 times, a peak was obtained in the range of from 0.4 to 0.55 (V) of the V, and, in all charge/discharges until the 30$^{th}$ time of the charge/discharge from the charge/discharge where this peak appeared for the first time, this peak was obtained.

Furthermore, the first time efficiency of the silicon-based active material alone (SiO$_x$ alone) was calculated as shown below. First, the above-prepared particles of negative electrode active material and polyacrylic acid were mixed at a mass ratio of 85:15, and the mixture was coated on a copper foil. An area density of the mixture coated at this time was about 2 mg/cm$^2$. Thereafter, after vacuum drying at 90° C. for 1 hour, in a coin battery shape of 2032 size, with a counter electrode Li, a constant current and constant voltage charge was started at a voltage of 0 V and a current density of 0.2 mA/cm$^2$. Then, at the time point where the current value became 0.1 mA, the constant current and constant voltage charge was stopped. Subsequently, a constant current discharge was performed, and at the time point where the voltage reached 1.2 V, the discharge was stopped. The current density during the discharge was set to the same as in the charge. At this time, when the condition under which Li is input into the negative electrode is taken as the charge, and the condition under which the Li is taken out from the negative electrode is taken as the discharge, the first time efficiency of the silicon-based active material alone (SiO$_x$ alone) becomes (discharge capacity)/(charge capacity)×100 (%). By using the formula, the first time efficiency of the SiO$_x$ alone was calculated. As a result thereof, the first time efficiency of the SiO$_x$ alone was 80.5%.

Example 1-2

A secondary battery was prepared in the same manner as in Example 1-1 except that, as shown in FIG. 4, particles of negative electrode active material in which peak intensities A, B, C and D in $^{29}$Si-MAS-NMR spectra satisfy the formula 1 and formula 2 were used. Furthermore, as obvious from FIG. 4, a peak was obtained also at a position where a chemical shift value is in the vicinity of −130 ppm. Furthermore, at a position where the chemical shift value is in −40 to −60 ppm, a mild peak appeared.

In Example 1-2, the particles of negative electrode active material modified by the thermal doping method were further modified by a redox method. Specifically, first, the particles of negative electrode active material modified by the thermal doping method were soaked in a solution (solution A$_1$) in which a lithium piece and biphenyl are dissolved in tetrahydrofuran (hereinafter referred also as THF). The solution A$_1$ of Example 1-1 was prepared by dissolving biphenyl at a concentration of 1 mol/L in the THF solvent, followed by adding a lithium piece of a mass portion of 10% by mass to a mixed solution of the THF and biphenyl. Furthermore, a temperature of the solution when the particles of negative electrode active material are soaked was set to 20° C. and a soaking time was set to 10 hours. Thereafter, the particles of negative electrode active material were filtered. According to the above treatment, the lithium was inserted in the particles of negative electrode active material.

Next, the particles of negative electrode active material after lithium insertion were soaked in a solution (solution B) in which naphthalene is dissolved in THF. The solution B of Example 1-2 was prepared by dissolving naphthalene at a concentration of 2 mol/L in the THF solvent. Furthermore, a temperature of the solution when the particles of negative electrode active material are soaked was set to 20° C. and a soaking time was set to 20 hours. After that, the particles of negative electrode active material were filtered.

Next, the particles of negative electrode active material after contact with the solution B were soaked in a solution (solution C) in which p-benzoquinone is dissolved at a concentration of 1 mol/L in THF. The soaking time was set to 2 hours. After that, the particles of negative electrode active material were filtered. Then, the silicon compound after cleaning treatment was dried under reduced pressure. After the modification, cleansing with alcohol, alkali water, weak acid or pure water was performed.

Furthermore, from the similar negative electrode and the counter electrode lithium as in the secondary battery prepared in Comparative Example 1-2, a test cell of a 2032 size coin battery type was prepared, and its discharge behavior was evaluated in the same manner as in Example 1-1. As a result thereof, a peak was obtained in the range of 0.4 to 0.55 (V) of V in the charge/discharge within 30 times. Furthermore, when the first time efficiency of the SiO$_x$ alone was calculated in the same manner as in Example 1-1, the first time efficiency of the SiO$_x$ alone was 85.3%.

Comparative Example 1-1

A secondary battery was produced under the same condition as in Example 1-1 except that particles of negative electrode active material in which peak intensities A, B, C and D in the $^{29}$Si-MAS-NMR spectra satisfy neither the formula 1 nor the formula 2 were used as shown in FIG. 4. As obvious from FIG. 4, in the spectrum, an intensity D of a peak derived from a silicon dioxide region where the chemical shift value is obtained in the vicinity of −110 ppm was the strongest. It is to be noted that it could not determine whether the chemical shift value of the $^{29}$Si-MAS-NMR spectra is present in the vicinity of −130 ppm. Furthermore, the chemical shift value of the $^{29}$Si-MAS-NMR spectra did not show a peak at a position of −40 to −60 ppm. In Comparative Example 1-1, the particles of negative electrode active material prepared in the same procedure as in Example 1-1 except that the modification of Example 1-1 was not applied were used.

Furthermore, from the similar negative electrode and the counter electrode lithium as in the secondary battery prepared in Comparative Example 1-1, a test cell of a 2032 size coin battery type was prepared, and its discharge behavior was evaluated in the same manner as in Example 1-1. As a result thereof, in the charge/discharge within 30 times, a peak was obtained in the range of 0.4 to 0.55 (V) of V. Furthermore, when the first time efficiency of the SiO$_x$ alone was calculated in the same manner as in Example 1-1, the first time efficiency of the SiO$_x$ alone was 71%.

At this time, the particles of negative electrode active material of Examples 1-1 and 1-2 and Comparative Example 1-1 had properties such as shown below. The median diameter D$_{50}$ of the particles of negative electrode active material was 4.0 μm. Furthermore, an average thickness of the carbon material on a surface of the particles of negative electrode active material was 100 nm.

Furthermore, the silicon compound of Examples 1-1 and 1-2 had a half-value width (2θ) of a diffraction peak due to a Si (111) crystal plane obtained by X-ray diffractometry of 1.755° and a crystallite size due to the Si(111) crystal plane of 4.86 nm.

In Table 1, results of Examples 1-1 and 1-2 and Comparative Example 1-1 are shown.

TABLE 1

SiOx x = 1 D$_{50}$ = 4 μm, copper foil:
carbon 100 ppm, sulfur 100 ppm, SiOx rate 10%
by mass, positive electrode NCA, carbon material
average thickness 100 nm, with dQ/dV peak

| | Formula 1 | Formula 2 | Peak of −130 ppm | Peak of −40 to −60 ppm | Retention Rate (%) | Initial Efficiency (%) |
|---|---|---|---|---|---|---|
| Comparative Example 1-1 | Not satisfy | Not satisfy | Impossible to discriminate | No | 75.0 | 84.0 |
| Example 1-1 | Not satisfy | Satisfy | Yes | Slight | 80.0 | 87.5 |
| Example 1-2 | Satisfy | Satisfy | Yes | Yes | 81.0 | 89.0 |

When the thermal doping method was applied to the negative electrode active material of Example 1-1 to modify, that is, to the particles of negative electrode active material like in Example 1-1, silicon dioxide corresponding to an irreversible component may be reduced by a definite amount and may be changed to lithium silicate or the like, and the particles of negative electrode active material that satisfy the formula 2 could be obtained. In this case, as shown in Table 1, the capacity retention rate and initial efficiency were improved compared with Comparative Example 1-1 that satisfies neither the formulas 1 nor the formula 2. Furthermore, when the silicon dioxide component remained after application of the thermal doping method is further modified by the redox method like in Example 1-2, the negative electrode active material that satisfies both the formulas 1 and 2 were obtained. In this case, the capacity retention rate and initial efficiency more excellent than in Example 1-1 were obtained.

Examples 2-1 and 2-2, Comparative Examples 2-1 and 2-2

Each of secondary batteries was prepared under the same condition as in Example 1-2 except that an amount of oxygen in the inside of a bulk of the silicon compound is adjusted. In this case, the amount of oxygen is adjusted by changing the ratio of metallic silicon and silicon dioxide in the silicon compound or the heated temperature. The value of "x" of the silicon compound expressed by SiO$_x$ in Example 2-1, 2-2, Comparative Example 2-1, 2-2 is shown in Table 2.

TABLE 2

SiOx D$_{50}$ = 4 μm, copper foil: carbon 100 ppm, sulfur 100 ppm,
SiOx rate 10% by mass, positive electrode NCA, carbon
material average thickness 100 nm, Si(111) half value width
1.755° crystallite 4.86 nm, formula 1 and formula 2 are
satisfied, with −130 ppm peak, with −40 to −60 ppm peak

| Table 2 | x | dQ/dV Peak | Retention Rate (%) | Initial Efficiency (%) |
|---|---|---|---|---|
| Example 1-2 | 1 | Yes | 81.0 | 89.0 |
| Comparative Example 2-1 | 0.3 | No | 69.0 | 91.0 |
| Example 2-1 | 0.5 | No | 76.0 | 90.0 |
| Example 2-2 | 1.5 | Yes | 80.0 | 89.0 |
| Comparative Example 2-2 | 1.8 | Yes | — | — |

As shown in Table 2, the battery characteristics were further improved when the value of "x" is in the range of 0.5≤x≤1.6 in the silicon compound expressed by SiO$_x$. When oxygen is not sufficient (x=0.3) like in Comparative Example 2-1, the initial efficiency was improved but the capacity retention rate was drastically degraded. On the other hand, when an amount of oxygen is excessive (x=1.8) as shown in Comparative Example 2-2, due to excess oxygen, the occluding and emitting the lithium is difficult to occur and the capacity of the silicon oxide is not substantially developed, therefore the evaluation was stopped.

Example 3-1

A secondary battery was produced under the same condition as in Example 1-1 except that the modification condition of the particles of negative electrode active material was changed such that the chemical shift value of the $^{29}$Si-MAS-NMR spectrum does not appear at a position of −40 to −60 ppm. In this case, a heat treatment temperature in the thermal doping, a particle size of LiH, and a heat treatment time were varied.

TABLE 3

SiOx x = 1 D$_{50}$ = 4 μm, copper foil: carbon 100 ppm, sulfur 100 ppm, SiOx rate 10% by mass, positive electrode NCA, carbon material average thickness 100 nm, Si(111) half value width 1.755° crystallite 4.86 nm, formula 1 is not satisfied, formula 2 is satisfied, with −130 ppm peak, with dQ/dV peak

| Table 3 | −40~−60 ppm Peak | Retention Rate (%) | Initial Efficiency (%) |
|---|---|---|---|
| Example 1-1 | Slight | 80.0 | 87.5 |
| Example 3-1 | No | 79.0 | 87.0 |

The capacity retention rate and initial efficiency were improved when the chemical shift value appeared at a position of −40 to −60 ppm.

Examples 4-1 to 4-5

Each of secondary batteries was prepared under the same condition as in Example 1-2 except that the crystallinity of Si crystallites in the particles of silicon compound was varied as shown in Table 4, and the cycle characteristics and first time efficiency were evaluated. It is to be noted that the crystallinity of the Si crystallites in the particles of silicon compound may be controlled by changing a vaporization temperature of a raw material, or by a heat treatment after generation of the particles of silicon compound.

TABLE 4

SiOx x = 1, copper foil: carbon 100 ppm, sulfur 100 ppm, SiOx rate 10% by mass, with dQ/dV peak, positive electrode NCA, carbon material average thickness 100 nm, formula 1 and 2 are satisfied, with −130 ppm peak, with −40 to −60 ppm peak

| Table 4 | Half Value Width (°) | Crystallite Size (nm) | Retention Rate (%) | Initial Efficiency (%) |
|---|---|---|---|---|
| Example 4-1 | 2.593 | 3.29 | 82.0 | 88.3 |
| Example 4-2 | 1.845 | 4.62 | 81.5 | 88.5 |
| Example 1-2 | 1.755 | 4.86 | 81.0 | 89.0 |
| Example 4-3 | 1.218 | 7.21 | 80.0 | 89.5 |
| Example 4-4 | 1.025 | 8.55 | 76.0 | 89.5 |
| Example 4-5 | 0.796 | 10.84 | 75.0 | 89.2 |

The capacity retention rates and first time efficiencies varied corresponding to the crystallinities of the Si crystallites in the particles of silicon compound. High capacity retention rate was obtained in particular in a low crystallinity material in which the half value width is 1.20 or more and the crystallite size due to a Si (111) plane is 7.5 nm or less.

Examples 5-1 to 5-5

Each of secondary batteries was prepared under the same condition as in Example 1-2 except that the median diameter of the particles of negative electrode active material was varied as shown in Table 5, and the cycle characteristics and first time efficiency were evaluated.

TABLE 5

SiOx x = 1, copper foil: carbon 100 ppm, sulfur 100 ppm, SiOx rate 10% by mass, with dQ/dV peak, positive electrode NCA, carbon material average thickness 100 nm, Si(111) half value width 1.755° crystallite size 4.86 nm, formula 1 and formula 2 are satisfied, with −130 ppm peak, with −40 to −60 ppm peak

| Table 5 | Median Diameter (μm) | Retention Rate (%) | Initial Efficiency (%) |
|---|---|---|---|
| Example 1-2 | 4 | 81.0 | 89.0 |
| Example 5-1 | 0.5 | 78.0 | 87.5 |
| Example 5-2 | 1 | 80.0 | 88.0 |
| Example 5-3 | 10 | 80.0 | 89.5 |
| Example 5-4 | 15 | 79.0 | 89.5 |
| Example 5-5 | 20 | 75.0 | 87.2 |

The retention rate was improved when the median diameter of the silicon compound is 1.0 μm or more. This is considered that a surface area a mass of the silicon compound is not excessively large, an area by which a side reaction occurs may be made smaller, and the consumption of the electrolytic solution was suppressed. On the other hand, when the median diameter is 15 μm or less, the particles are difficult to be cracked during charge, and an SEI (solid electrolyte interface) due to a newly generated surface is difficult to be generated during charge/discharge, therefore the loss of reversible Li may be suppressed. Furthermore, when the median diameter of the particles of silicon-based active material is 15 μm or less, an expansion amount of the particles of silicon compound during charge may not become large, therefore physical and electrical breakdown of the negative electrode active material layer due to expansion may be prevented.

Example 6-1

A secondary battery was prepared under the same condition as in Example 1-1 except that a carbon material was not coated on a surface of the particles of silicon compound, followed by evaluating the cycle characteristics and the first time efficiency.

Examples 6-2 to 6-5

Each of secondary batteries was prepared under the same conditions as in Example 1-1 except that an average thickness of the carbon material coated on a surface of the particles of silicon compound was varied, followed by evaluating the cycle characteristics and the first time efficiency. An average thickness of the carbon material may be adjusted by changing the CVD conditions.

TABLE 6

SiOx x = 1, $D_{50}$ = 4 μm, copper foil: carbon 100 ppm, sulfur 100
ppm, SiOx rate 10% by mass, positive electrode NCA, Si(111)
half value width 1.755° crystallite size 4.86 nm, with
dQ/dV peak, formula 1 and formula 2 are satisfied, with
−130 ppm peak, with −40 to −60 ppm peak

| Table 6 | Average Thickness (nm) | Retention Rate (%) | Initial Efficiency (%) |
|---|---|---|---|
| Example 1-1 | 100 | 81.0 | 89.0 |
| Example 6-1 | 0 | 77.0 | 88.0 |
| Example 6-2 | 10 | 80.0 | 89.0 |
| Example 6-3 | 500 | 81.0 | 89.0 |
| Example 6-4 | 1000 | 81.0 | 89.0 |
| Example 6-5 | 5000 | 81.0 | 88.5 |

As obvious from Table 6, the retention rate and the initial efficiency may be improved since the electric conductivity is particularly improved when the average thickness of the carbon material is 10 nm or more. On the other hand, when the average thickness of the carbon material is 5000 nm or less, the battery capacity may be sufficiently secured, since an amount of the particles of silicon compound may be sufficiently secured from the viewpoint of battery design.

Example 7-1

A secondary battery was prepared under the same condition as in Example 1-1 except that a copper foil that does not contain carbon and sulfur was used as a current collector of the negative electrode, followed by evaluating the cycle characteristics and the first time efficiency.

TABLE 7

SiOx x = 1, $D_{50}$ = 4 μm, SiOx rate 10% by mass, with dQ/dV peak,
positive electrode NCA, carbon material average thickness
100 nm, Si(111) half value width 1.755° crystallite size
4.86 nm, formula 1 and formula 2 are satisfied, with −130
ppm peak, with −40 to −60 ppm peak

| Table 7 | Carbon and Sulfur in Copper Foil | Retention Rate (%) | Initial Efficiency (%) |
|---|---|---|---|
| Example 1-2 | Yes | 81.0 | 89.0 |
| Example 7-1 | No | 77.0 | 88.0 |

The strength of the current collector is improved when the current collector of the negative electrode contains carbon and sulfur each at 100 mass ppm or less. Therefore, when the silicon-based negative electrode active material having large expansion, contraction during the charge/discharge of the secondary battery is used, deformation and strain of the current collector accompanying this may be suppressed, and, the battery characteristics, in particular, the cycle characteristics are improved as in Example 1-1.

Example 8-1

A secondary battery was prepared under the same condition as in Example 1-1 except that a ratio of a mass of the particles of negative electrode active material (particles of silicon-based active material) in the negative electrode active material was changed, followed by evaluating an increase ratio of the battery capacity.

It is to be noted that, when the carbon-based active material is not used (when the ratio of the carbon-based active material in the negative electrode active material is set to 100% by mass), the particles of silicon-based active material, the conductive assistant 1 (carbon nanotube, CNT), the conductive assistant 2 (carbon fine particles having a median diameter of about 50 nm), and a precursor (polyamic acid) of a negative electrode binder were mixed at a dry weight ratio of 83:10:2:5, followed by diluting with NMP to form a paste-like negative electrode mixture slurry. In this case, NMP was used as a solvent of the polyamic acid. Subsequently, the negative electrode mixture slurry was coated on both sides of the negative electrode current collector with a coating machine and dried. An electrolytic copper foil (thickness=15 μm) was used as the negative electrode current collector. Finally, firing was applied at 400° C. for 1 hour in a vacuum atmosphere. Thus, a negative electrode binder (polyimide) was formed.

Comparative Example 8-1

A secondary battery was prepared under the same condition as in Comparative Example 1-1 except that a ratio of a mass of the particles of negative electrode active material (particles of silicon-based active material) in the negative electrode active material was changed, followed by evaluating the increase rate of the battery capacity.

Figure 5:
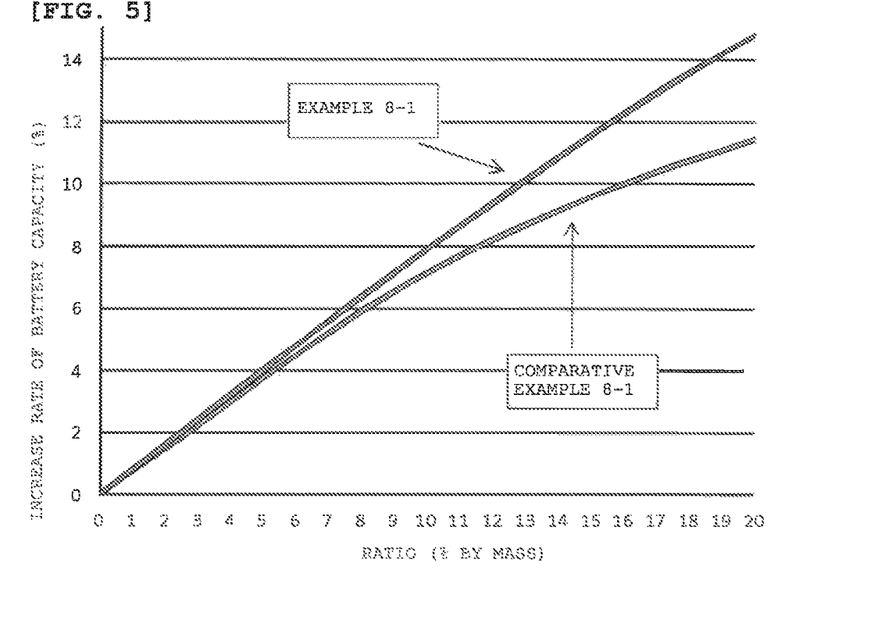
FIG. 5 is a graph showing increase rates of battery capacity in Example 8-1 and Comparative Example 8-1.

In FIG. 5, a graph that expresses a relationship between a ratio of the particles of silicon-based active material to a sum total of the negative electrode active material and an increase rate of the battery capacity of the secondary battery is shown in each of Example 8-1 and Comparative Example 8-1. As obvious from FIG. 5, when a rate of the silicon-based compound becomes 6% by mass or more in Example 8-1, the increase rate of the battery capacity becomes larger than in Comparative Example 8-1, and a volume energy density increases particularly remarkably.

It is to be noted that the present invention is not limited to the foregoing embodiment. The embodiment is just an exemplification, and any of examples that have substantially the same feature and demonstrate the same functions and effects as those in the technical concept described in claims of the present invention are included in the technical scope of the present invention.

The invention claimed is:

1. A negative electrode active material comprising:
particles of negative electrode active material,
wherein the particles of negative electrode active material contain particles of silicon compound containing a silicon compound ($SiO_x$: 0.5≤x≤1.6),
the particles of negative electrode active material contain crystalline $Li_2SiO_3$ in at least a part thereof, and
the particles of negative electrode active material satisfy the following formula 1 and formula 2 between an intensity A of a peak derived from $Li_2SiO_3$, an intensity B of a peak derived from Si, an intensity C of a peak derived from $Li_2Si_2O_5$, and an intensity D of a peak derived from $SiO_2$, which are obtained from $^{29}$Si-MAS-NMR spectra $$A > B > D \qquad (1)$$

$$A > C > D \qquad (2).$$

2. The negative electrode active material according to claim 1, wherein a chemical shift value obtained from the $^{29}$Si-MAS-NMR spectrum has a peak in the vicinity of −130 ppm.

3. The negative electrode active material according to claim 1, wherein the chemical shift value obtained from the $^{29}$Si-MAS-NMR spectrum has a peak in −40 to −60 ppm.

4. The negative electrode active material according to claim 1, wherein the particles of silicon compound have a half value width (2θ) of a diffraction peak derived from a Si(111) crystal plane obtained by X-ray diffractometry of 1.2° or more and a crystallite size corresponding to the crystal plane of 7.5 nm or less.

5. The negative electrode active material according to claim 1, wherein a test cell formed of a negative electrode containing a mixture of the negative electrode active material and a carbon-based active material and a counter electrode lithium is prepared, in the test cell, charge/discharge formed of charge during which a current is flowed so as to insert lithium into the negative electrode active material and discharge during which the current is flowed so as to desorb the lithium from the negative electrode active material is carried out 30 times, and when a graph showing a relationship between a differential value dQ/dV obtained by differentiating a discharge capacity Q by a potential V of the negative electrode based on the counter electrode lithium and the potential V is depicted in each charge/discharge, the potential V of the negative electrode during discharges on or after X times (1≤X≤30) has a peak in the range of from 0.40 V to 0.55 V.

6. The negative electrode active material according to claim 1, wherein the particles of negative electrode active material have a median diameter of 1.0 μm or more and 15 μm or less.

7. The negative electrode active material according to claim 1, wherein the particles of negative electrode active material contain a carbon material on a superficial layer part.

8. The negative electrode active material according to claim 7, wherein an average thickness of the carbon material is 10 nm or more and 5000 nm or less.

9. A mixed negative electrode active material comprising: the negative electrode active material according to claim 1 and a carbon-based active material.

10. A negative electrode for nonaqueous electrolyte secondary battery comprising:
the mixed negative electrode active material according to claim 9,
wherein a ratio of a mass of the negative electrode active material relative to a sum total of masses of the negative electrode active material and the carbon-based active material is 6% by mass or more.

11. A negative electrode for nonaqueous electrolyte secondary battery comprising:
a negative electrode active material layer formed with the mixed negative electrode active material according to claim 9; and
a negative electrode current collector,
wherein the negative electrode active material layer is formed on the negative electrode current collector; and
the negative electrode current collector contains carbon and sulfur each at a content of 100 mass ppm or less.

12. A lithium ion secondary battery comprising:
a negative electrode containing the negative electrode active material according to a claim 1 as a negative electrode.

13. A production method of a negative electrode active material containing particles of negative electrode active material containing particles of silicon compound comprising:
preparing particles of negative electrode active material containing particles of silicon compound containing a silicon compound ($SiO_x$:0.5≤x≤1.6); and
selecting particles of negative electrode active material that contain crystalline $Li_2SiO_3$ in at least a part thereof and satisfy the following formula 1 and formula 2 between an intensity A of a peak derived from $Li_2SiO_3$, an intensity B of a peak derived from Si, an intensity C of a peak derived from $Li_2Si_2O_5$, and an intensity D of a peak derived from $SiO_2$, which are obtained from $^{29}$Si-MAS-NMR spectra, from the particles of negative electrode active material,
wherein a negative electrode active material is produced with the selected particles of negative electrode active material

A>B>D    (1)

A>C>D    (2).

14. A production method of a lithium ion secondary battery comprising:
preparing a negative electrode with the negative electrode active material produced according to the production method of the negative electrode active material according to claim 13; and
producing a lithium ion secondary battery with the prepared negative electrode.

* * * * *